A. J. LEWIS, A. E. McCLAIN, W. O. SKEEN & J. O. MASSEY.
PAD AND CLIP ASSEMBLING MACHINE.
APPLICATION FILED NOV. 12, 1915.

1,241,863.

Patented Oct. 2, 1917.

Witnesses.
C. B. Yoder
W. Thornton Bogert

Inventors.
Arthur J. Lewis
Arthur E. McClain
Walter Ole Skeen
James O. Massey
By Walter Murray
Attorney

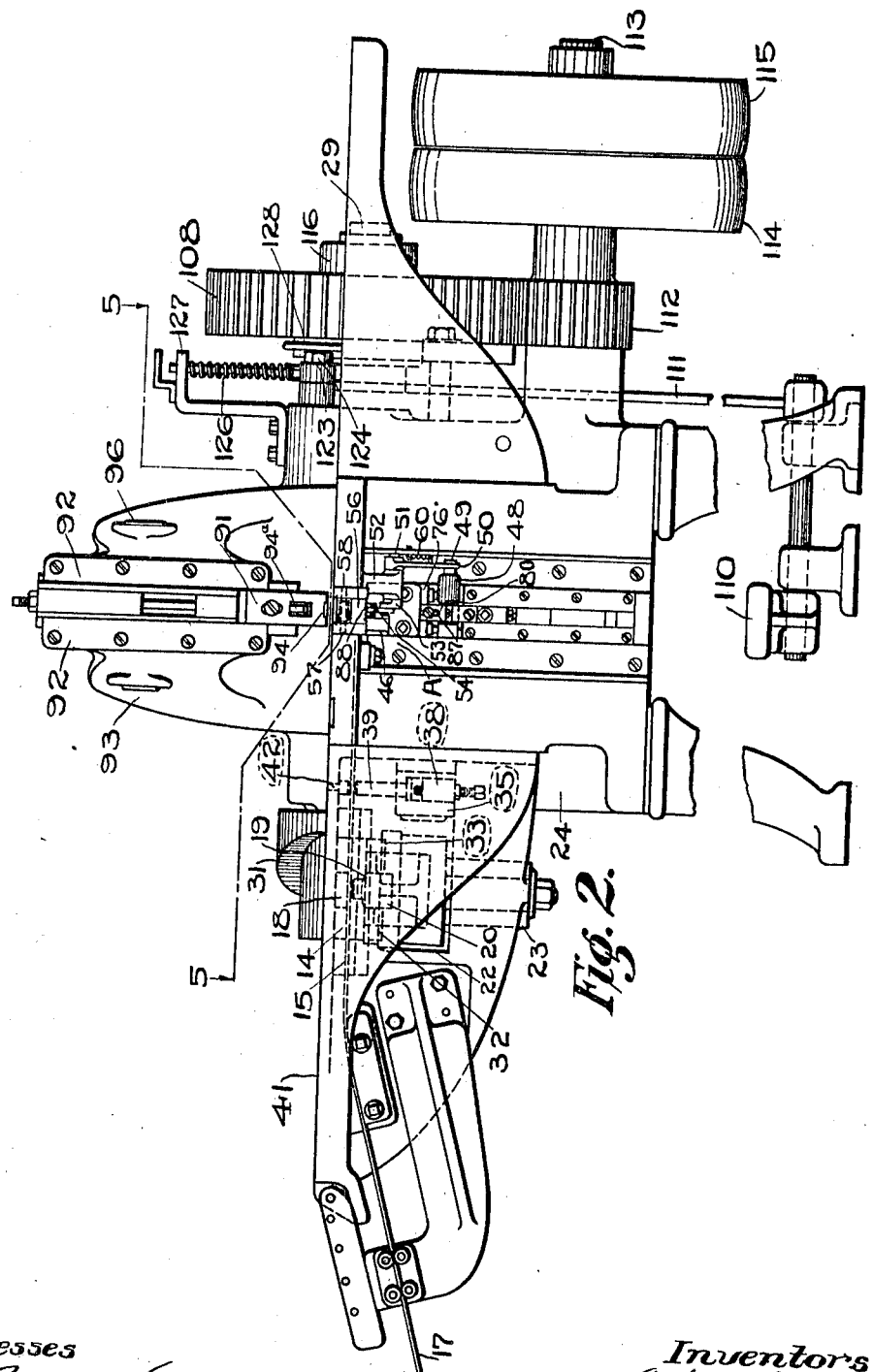

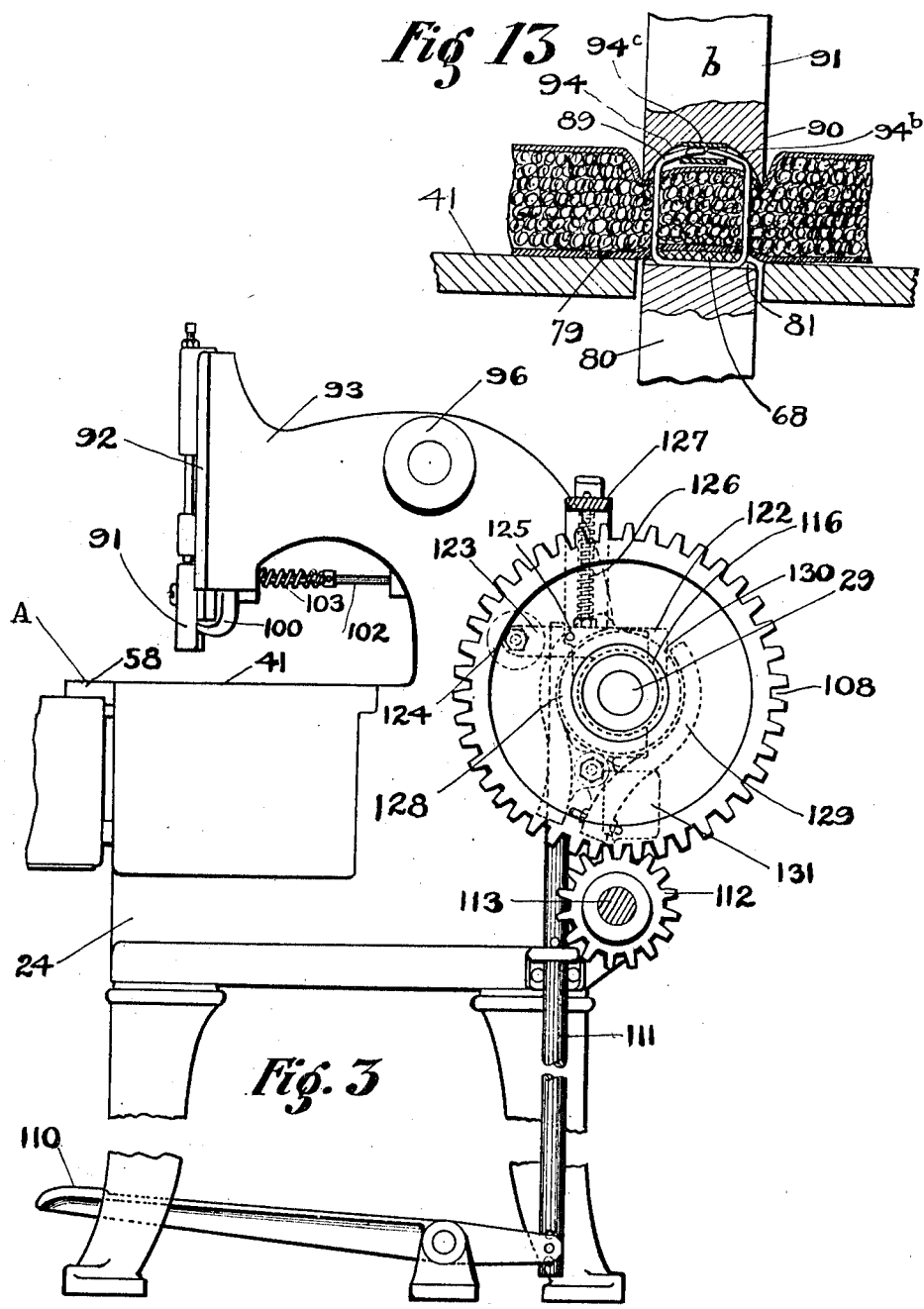

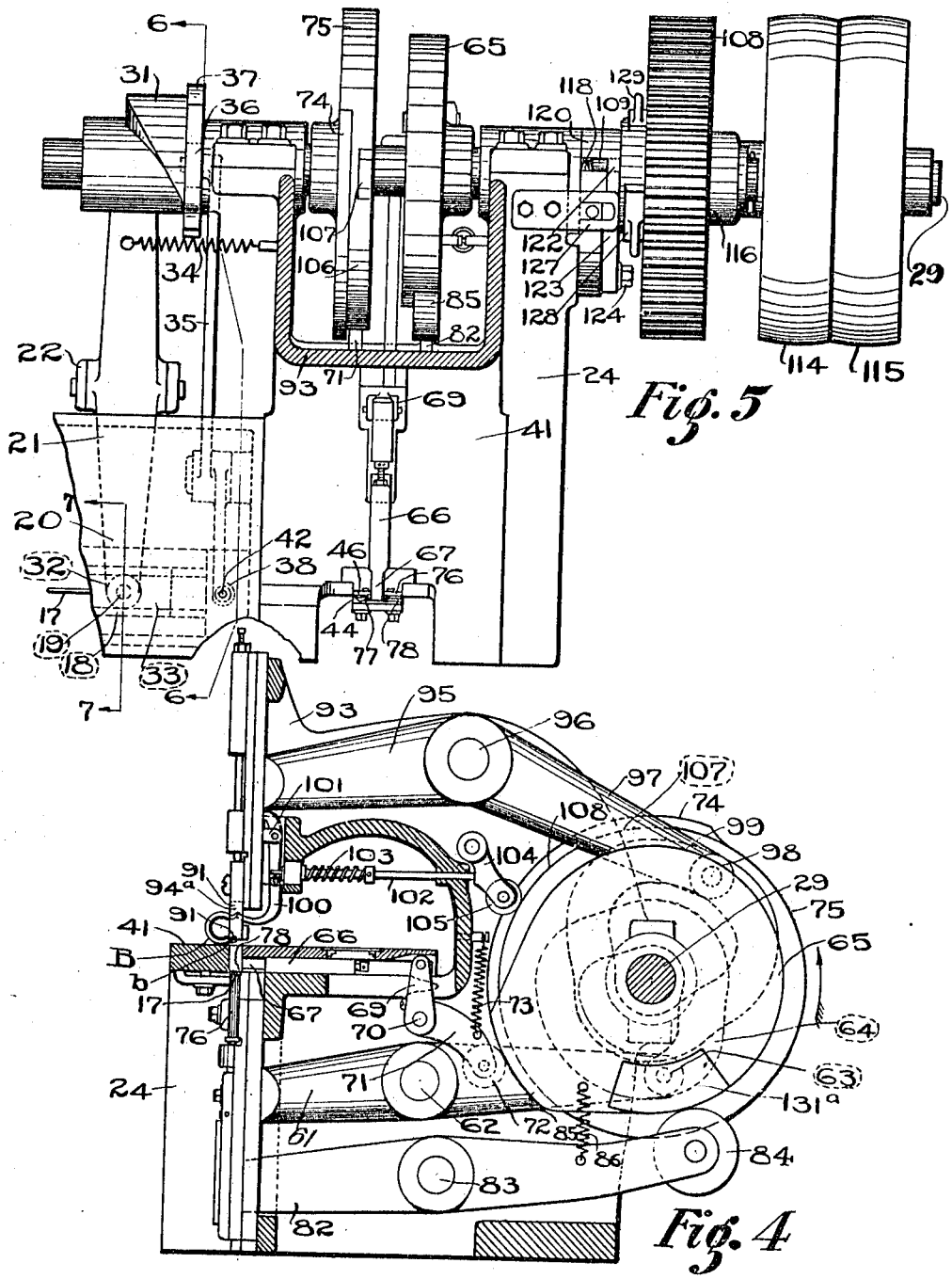

A. J. LEWIS, A. E. McCLAIN, W. O. SKEEN & J. O. MASSEY.
PAD AND CLIP ASSEMBLING MACHINE.
APPLICATION FILED NOV. 12, 1915.
1,241,863.
Patented Oct. 2, 1917.
6 SHEETS—SHEET 5.
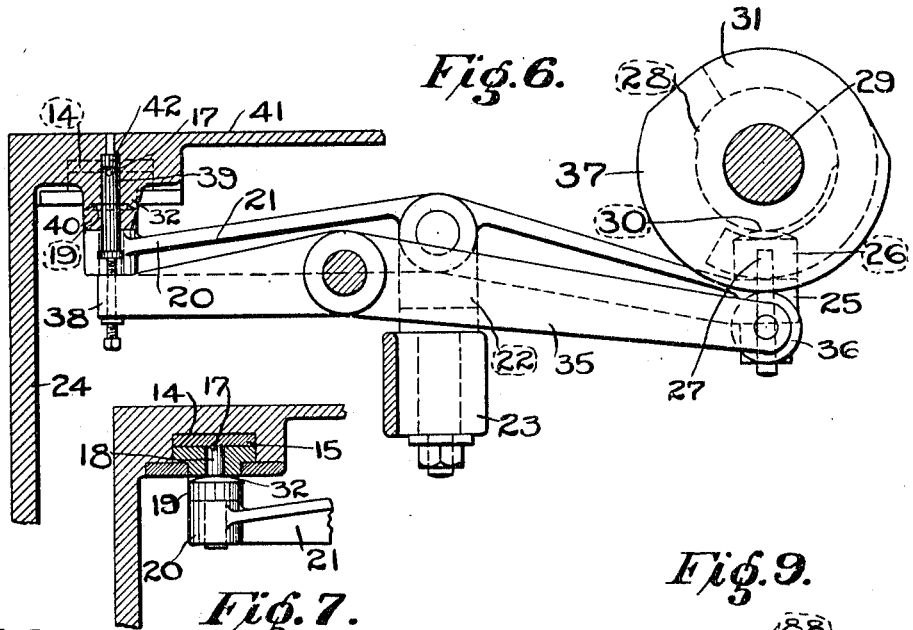
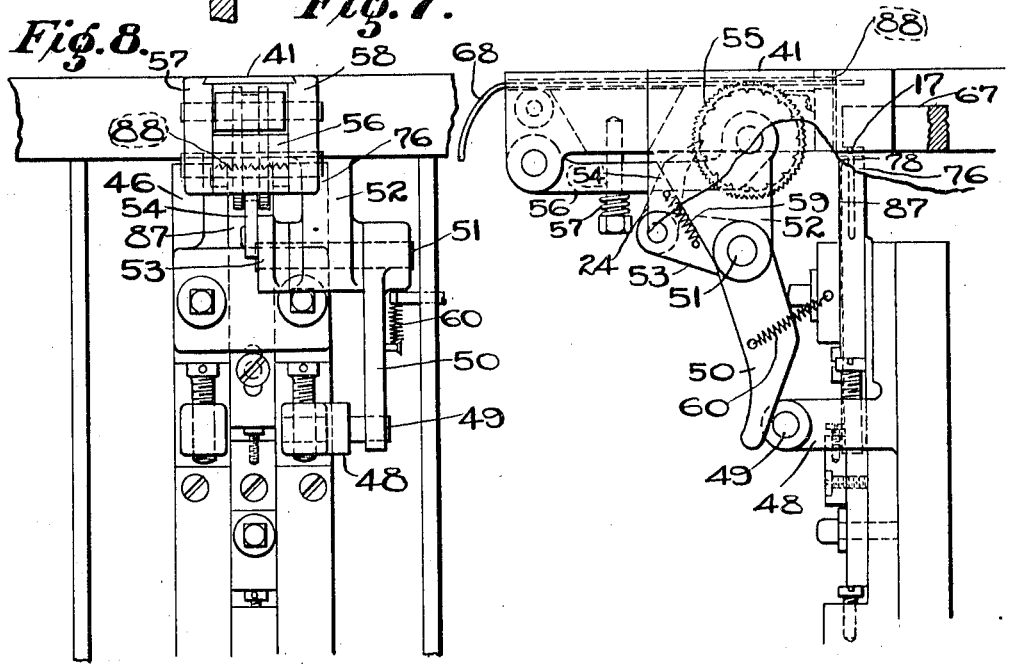
Witnesses.
Inventors
Arthur J. Lewis
Arthur E. McClain
Walter Ole Skeen
James O. Massey
By Walter P. Murray Attorney.

A. J. LEWIS, A. E. McCLAIN, W. O. SKEEN & J. O. MASSEY.
PAD AND CLIP ASSEMBLING MACHINE.
APPLICATION FILED NOV. 12, 1915.
1,241,863.
Patented Oct. 2, 1917.
6 SHEETS—SHEET 6.
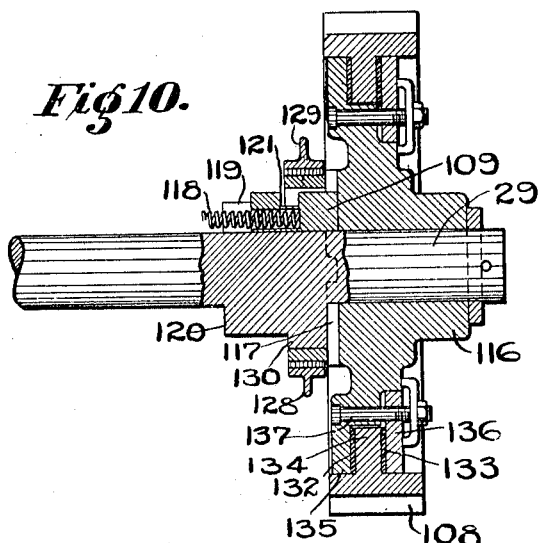
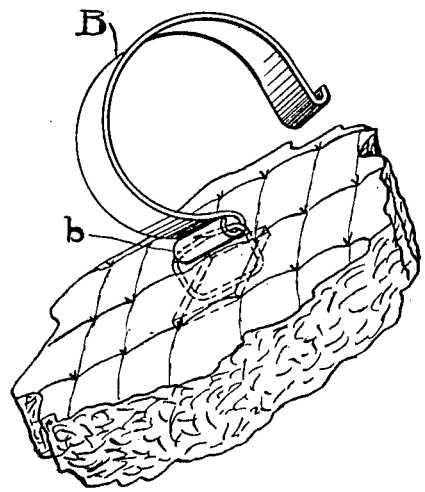
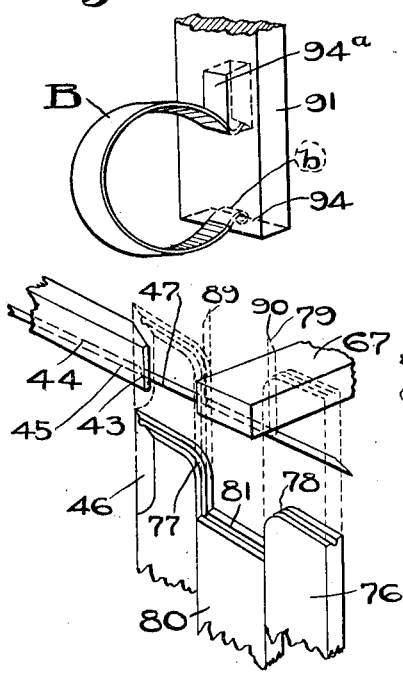
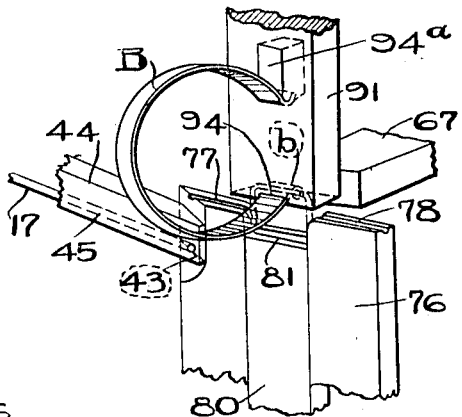
Witnesses
Inventors
Arthur J. Lewis
Arthur E. McClain
Walter Ole Skeen
James O. Massey
By Walter F. Murray
Attorney.

UNITED STATES PATENT OFFICE.

ARTHUR J. LEWIS, OF STRATFORD, CONNECTICUT, AND ARTHUR E. McCLAIN, WALTER OLE SKEEN, AND JAMES O. MASSEY, OF GREENFIELD, OHIO, ASSIGNORS, BY MESNE ASSIGNMENTS, TO THE AMERICAN PAD AND TEXTILE COMPANY, OF GREENFIELD, OHIO, A CORPORATION OF OHIO.

PAD AND CLIP ASSEMBLING MACHINE.

1,241,863.      Specification of Letters Patent.      Patented Oct. 2, 1917.

Application filed November 12, 1915. Serial No. 61,150.

*To all whom it may concern:*

Be it known that we, ARTHUR J. LEWIS, a citizen of the United States of America, and resident of Stratford, county of Fairfield, State of Connecticut, and ARTHUR E. McCLAIN, WALTER OLE SKEEN, and JAMES O. MASSEY, citizens of the United States of America, and residents of Greenfield, county of Highland, State of Ohio, have invented certain new and useful Improvements in Pad and Clip Assembling Machines, of which the following is a specification.

The object of this invention is to produce a machine for attaching clips to horse collar pads, in a rapid, cheap and efficient manner.

This and other objects are attained in the machine described in the following specification and illustrated in the accompanying drawings, in which;

Fig. 2 is a front elevation of the machine illustrated in Fig. 1.

Fig. 3 is an end elevation of the machine illustrated in Fig. 1.

Fig. 4 is a sectional view taken on the line 4—4 of Fig. 1.

Fig. 5 is a fragmental sectional view taken on the line 5—5 of Fig. 2.

Fig. 6 is a fragmental sectional view taken on the line 6—6 of Fig. 5.

Fig. 7 is a fragmental sectional view taken on the line 7—7 of Fig. 5.

Fig. 8 is a front elevation of the mechanism indicated by the letter A in Figs. 1, 2 and 3, which is employed for inserting a reinforcing washer between the clip fastening means and the pad, previous to the operation of permanently securing the clip thereto.

Fig. 9 is a side elevation of the mechanism illustrated in Fig. 8, with certain portions of the frame broken away for clearness of illustration.

Fig. 10 is a sectional view taken on the line 10—10 of Fig. 1.

Fig. 11 is a somewhat diagrammatic fragmental perspective view of the mechanism employed in forming the means for attaching the clip to the pad and for securing the clip to the fastening means, the parts being shown in positions for forming the fastening means.

Fig. 12 is a view similar to that of Fig. 11 but showing the parts occupying different positions, the fastening means and the clip having been moved toward one another, and secured together.

Fig. 13 is a fragmental sectional view of the staple clenching mechanism, showing the manner in which the ends of the staple are bent into the loop formed on the end of the clip, after the staple has been passed through the pad to which the clip is to be secured.

Fig. 14 is a fragmental perspective view of a clip secured to the pad, and showing the relative locations of the beveled ends of the staple fastening means inside the loop of the clip and the position of the washer between the staple and the pad.

Figure 1:
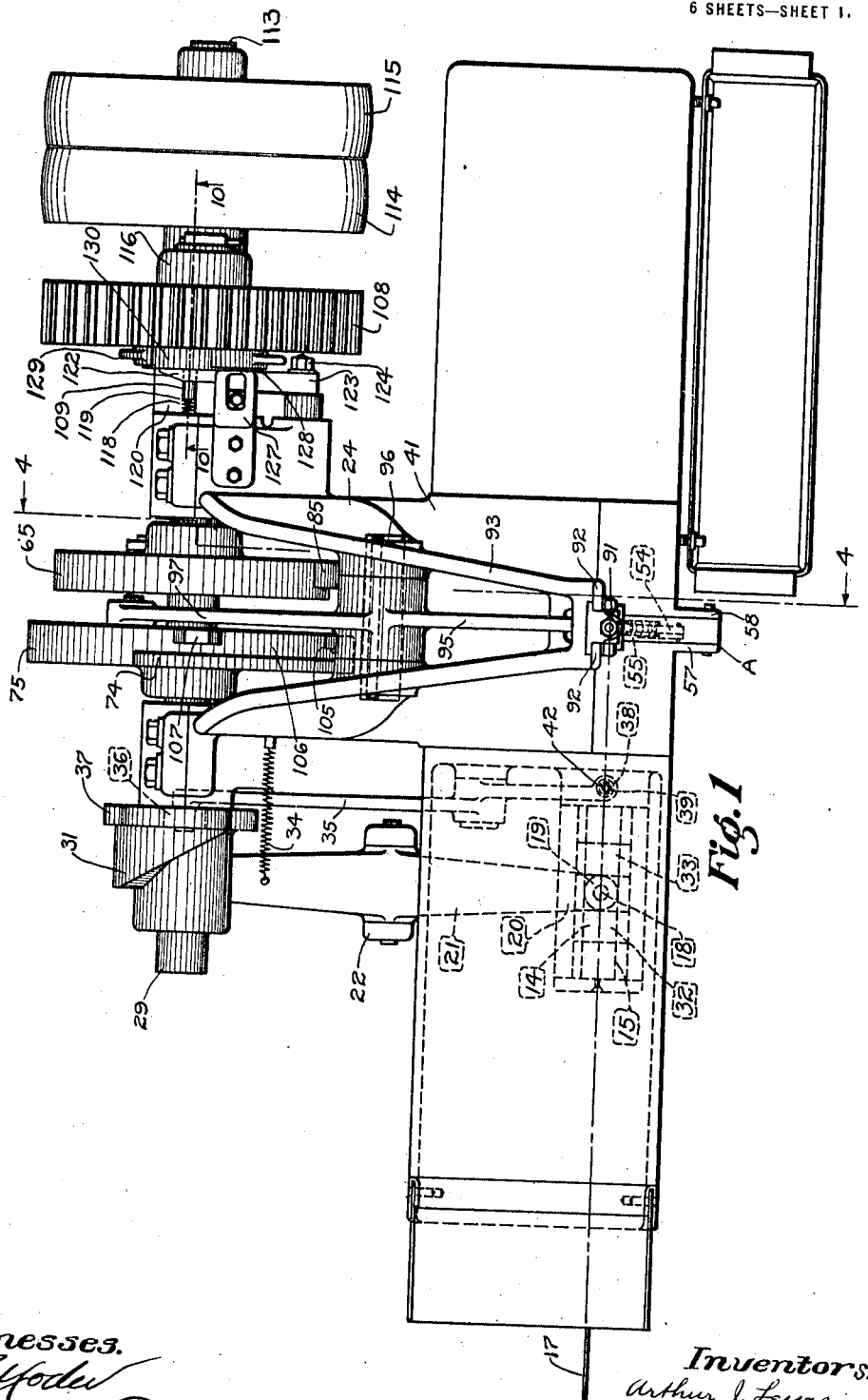
Figure 1 is a plan view of the machine embodying our invention.

The pad and clip assembling machine illustrated herewith is designed to attach clips of the type disclosed in Figs. 11, 12 and 13 to horse collar pads as set forth in United States Letters Patent No. 1119094 granted to Edward L. McClain. The machine is constructed to employ wire in securing the clips to the pad, and mechanism is employed for constructing a staple like fastening means for the clips from portions of the wire fed through the machine. The machine is further designed to bend the tangs of the staples through an eye formed on the clip, and in so doing to clench the ends into overlapping engagement with one another, so that the length of the tang occupying the loop formed in the clip will be greater than the diameter of the loop and thus prevent the tangs being accidentally withdrawn therefrom. To further increase the strength with which the clip is attached to the pad, additional mechanism is employed for feeding reinforcing means such as a felt washer between the transverse portion of the staple and the surface of the pad against which the transverse portion is brought to bear when the clip is secured in position. In the operation of the machine these functions are carried out successively in the following order, and the mechanism for performing each of the various steps will be described in the order in which the functions are performed. First the wire from which the clip fastening staples are formed, is passed to the wire feeding mechanism which is illustrated in detail in Figs. 6 and 7. This mechanism passes the wire in a step by step movement across the machine, beneath the pad supporting table, and above the cutting and forming dies illustrated in detail in Figs. 11 and 12. These dies are so timed with the wire feeding mechanism as to operate upon the wire at the time that the feeding mechanism is inoperative, and they perform the function of cutting off a portion of the wire in a manner to produce oppositely beveled ends. At this point and previous to the formation of a staple from the cut-off portion of wire, a mechanism for inserting a washer in position between the staple and the back of the pad through which it is passed, is brought into operation. This mechanism is illustrated in detail in Figs. 8 and 9, and is operated by the mechanism just described for cutting off the portion of wire from which the fastening staple is formed. The length of wire is then held securely against a forming die, while its beveled ends are bent at right angles to the middle thereof, to form the tangs of a staple. After this shearing and staple forming mechanism has performed its functions, another mechanism bearing the clip to be secured to the pad, is brought into engagement with the ends of the staple tangs and is so constructed as to divert the beveled ends of the tangs toward one another and into the opening extending through the loop formed on the clip. This operation is continued until the beveled ends of the tangs have been brought into overlapping engagement with one another within the loop of the clip. With the clip thus attached to the pad another mechanism is brought into operation to remove the clip from the tang clenching mechanism just described, and the clip and its attached pad are freed from the machine ready for a repetition of the operations above described.

The wire feeding mechanism, see Figs. 1, 2, 5, 6, 7, consists of a sliding plate 14 which is mounted to slide in ways 15 formed on the underface of the left hand end of the table, as shown in Fig. 1. This plate is provided with a groove 16 through which the wire 17 may pass, and is provided with a relatively movable grip pin 18, see Fig. 7, which is brought into gripping engagement with the wire located in the groove, by means of the cap 19 mounted on the end 20 of a lever 21. This lever is mounted to rock both transversely and longitudinally of the wire, upon a forked bracket 22 which is pivotally mounted in a bracket 23 extending from the side of the frame 24 of the machine. The rear end 25 of the lever is provided with a roller 26 which is rotatively mounted on a pin 27 adjustably mounted in the end 25 in order to raise or lower the roller with relation to the surface of a cam 28 mounted on the drive shaft 29 of the machine. The roller is provided with a convex top surface 30 for engaging the cam surface 28, so that as the cam is rotated the friction of the roller in engagement with the cam will be greatly reduced. In addition to this engagement of the roller with the cam 28, its peripheral surface is adapted to engage the surface of a cam 31 for the purpose of moving the end 25 in a direction longitudinally of the machine. This movement causes the end 20 to move longitudinally and to consequently move the plate 14, between the downwardly projecting lugs 32 and 33 of which the convexly headed pin 19 is located. The two cams 28 and 31 are so arranged on the drive shaft 29 that at the time the end 20 of the lever 21, is moved toward the center of the machine, the cam 28 will be in engagement with the surface 30 of the roller 26 so that the pin 18 is in gripping engagement with the wire located in the groove 16 of the plate 14. This gripping engagement causes the wire to be fed toward the center of the machine a distance equal to the length of movement of the end 20 of the lever when it is moving in response to the movement of its opposite end 25 upon the hump of the cam 31. As the forward movement of the end 20 ceases, the wire is released by the cam surface 28 disengaging the surface 30 of the roller 26, thereby permitting the end 20 to move away from the wire. Backward movement of the lever then takes place under the influence of a spring 34.

In order to prevent the wire becoming accidentally withdrawn from its advanced position, we have provided means consisting of a lever 35 located adjacent to the lever 21 and provided at its rear end with a roller 36 adapted to be operated upon by a cam 37 for the purpose of bringing the forward end 38 into pressing engagement with a gripping pin 39 mounted in a lug 40 on the under side of the pad receiving table 41, in position to grip the wire between the pin and an anvil 42. This cam 37 is so timed with relation to the cams 28 and 31, that the wire will be gripped between the anvil 42 and the pin 39 at the time of the return movement of the lever 21 and plate 14, to their initial gripping positions, and released upon forward or feeding movement of lever 21.

The feeding of the wire across the center of the machine for a distance corresponding to the movement of the end 20 of the lever 21, brings a portion thereof beyond the edge 43 of a knife 44 secured in alinement with the wire and provided with a longitudinally extending groove 45 for maintaining proper alinement of the wire therewith, see Figs. 11 and 12. The knife edge 43 of this tool 44 is preferably located at an acute angle to the wire so as to produce a beveled end thereon when a coöperating tool 46 is brought across the edge 43 to shear a portion 47 of the wire from the main portion. This operation produces a piece of wire which is provided with beveled ends having their points on opposite sides.

At this period of the operation of the machine, the mechanism for inserting a felt washer between the wire staple fastening means and the back of the pad, is brought into operation. This mechanism is operated by the upward movement of the slide portions carrying the knife 46, upon which a forwardly extending lug 48 is mounted, see Figs. 8 and 9. Projecting from the side of this lug is a pin 49 which is adapted to be brought into engagement with a lever 50 mounted on a pin 51 pivotally mounted in a bracket 52 extending from the under face of the table 41. Upon the opposite end of the pin 51 is secured an arm 53 which carries at its forward end a pivotally mounted pawl 54. The pawl engages a ratchet wheel 55 so that as the lever 50 is rocked in its mounting bracket 52, the pawl will be moved upwardly and cause intermittent rotation of the ratchet wheel 55. This ratchet is mounted on the inner end of an arm 56 pivotally mounted in forward extensions 57 and 58 of the frame 24, which arm is pressed by means of a spring 57 so as to hold the ratchet teeth in yielding engagement with a tape of felt 68, from which the washers to be inserted between the clip fastening staple and the pad, are cut. A spring 59 is provided for retaining the pawl in engagement with the ratchet teeth and a spring 60 is provided for retracting the lever 50 after its having been moved outwardly by the pin 49 on the lug 48.

Operation of the knife 46 and its simultaneously moving members which cause operation of the washer feeding mechanism, to shear the portion of the wire and extend the washer in position to be sheared, is caused by the operation of a lever 61, see Fig. 4, which is pivotally mounted on the pin 62 extending transversely of the frame. This lever has its forward end suitably connected with the knife 46 and its simultaneously moving members, and a roller 63 on its rear end in engagement with an eccentric groove 64 formed in a cam 65 mounted on the drive shaft 29 of the machine. The cam is so located on the shaft as to cause movement of the knife 46 and consequently of the washer feeding mechanism, after the wire feeding mechanism, previously described, has ceased.

After the operation of the washer feeding and wire cutting mechanism by means of the lever 61 and cam 65, a plunger 66 having a forming tool 67 formed on its forward end, is pushed forward so as to extend over the wire portion 47 which has been sheared by the knife 46. This forming tool is operated by a lever 69 secured to a pin 70 rotatively mounted in the frame of the machine and operated by means of an arm 71 carrying a roller 72 at its opposite end. The arm 71 is connected with a spring 73 which draws the arm upwardly to bring the roller 72 into engagement with the surface of a hump 74 formed on a cam disk 75 located adjacent to the cam disk 65 on the drive shaft 29. The operation of the plunger 66 and its connected mechanism is such as to cause forward projection of the plunger at the time the wire portion 47 has been sheared from the main portion 17. With the forming tool portion 67 of the plunger 66 moved to its projected position over the wire 47, as shown in Fig. 11, the ends of the wire portion 47 which extend beyond the forming tool 67 are in position to be bent upwardly at right angles to the center portion of the wire located around die 67. This bending is accomplished by means of the knife 46 and a coöperating simultaneously moving member 76. Both the knife 46 and member 76 are provided with rounded inner edges and with grooves 77 and 78 formed therein for engaging and directing the ends of the portion 47 upwardly and in alinement with one another to form the staple 79 shown in dotted lines in Fig. 11.

After the knife 46 and member 76 have been moved to the upper limit of their motion as shown in dotted lines in Fig. 11, to hold the staple in position around the forming die 67, a central member 80 is brought up beneath the forming die. This member is provided at its upper edge with a groove 81 adapted to receive the wire forming the central portion of the staple, and operation thereof is caused by a lever 82, see Fig. 4, the forward end of which engages the member 80 in any suitable manner. This lever is pivotally mounted on a shaft 83 extending transversely of the side frame members and is provided at its rear end with a roller 84 which engages the periphery of the cam disk 65 and rides upon the surface of a cam hump 85 formed thereon. The lever 82 is held in engagement with the periphery of the cam 65 by means of a spring 86 secured to the lever as shown in Fig. 4. At the time the supporting member 80 has been brought into engagement with the central portion of the staple 79, the forming tool 67 is withdrawn by the roller 72 riding upon the cam hump 74. This leaves the staple supported by the member 80 and between the knife 46 and its coöperating member 76. As soon as the forming tool has been completely withdrawn, the member 80 is carried farther in its upward movement and adjacent to the limit of its upward motion a knife 87 carried on the front face thereof is brought across a shearing member 88 located above the strip of felt 68, see Figs. 8 and 9. This results in a shearing of a portion of the felt strip to form a reinforcing washer which occupies the space between the two tangs 89 and 90 of the staple. The central member 80 will force the tangs 89 and 90 through the material of the pad located on the table 41, and cause their projection beyond its upper surface.

Simultaneously with the operation of the central support member 80 and the cutting off of the felt washer from the strip 68, a vertically disposed reciprocally mounted clip holder 91, see Figs. 11 and 12, is brought down upon the pad, a clip B having previously been placed in position with its eye (b) in the end of the holder. The clip holder is reciprocally mounted in guides 92 formed in the front face of a forwardly extending overhanging bracket 93 forming a portion of the frame. The end of the clip holder which engages the surface of the pad located on the table 41, is constructed with a recess 94 in which the looped end of the clip is located. Above this recess is an aperture 94ᵃ adapted to receive the opposite end of the clip to hold the clip in place on the holder. The recess 94 is so shaped that its sides 94ᵇ, see Fig. 13, are inclined toward the central loop receiving portion 94ᶜ thereof. This formation diverts the tangs 89 and 90 of the staple toward one another when the end of the clip holder 91 is brought into engagement therewith, with the result that the beveled ends of the tangs are directed toward the opening in the loop. As further downward movement of the clip holder and further simultaneous upward movement of the support 80 occurs, the beveled tangs are bent into the loop and are directed so that their beveled ends are located in overlapping engagement with one another, as shown in Figs. 12 and 14. In this position the length of each end occupying the loop is several times greater than the diameter of the loop and consequently when the loop is secured on the pad it cannot be pulled from the wire staple fastening means without bending the ends along their lengths as they are drawn from the loop. Operation of the clip holder is effected by the lever 95, see Fig. 4, connected therewith in the same manner that the levers 61 and 82 are connected with the knife 46 and the central member 80 respectively. The lever 95 is pivotally mounted on a shaft 96 extending transversely of the side members of the overhanging bracket 93, and is provided with a rearwardly extending portion 97 upon which a roller 98 is located. This roller operates in an eccentric groove 99 formed in the inner face of the cam disk 75, and is of the shape disclosed in Fig. 4.

After the clip has been attached by the wire fastening means to the pad, the clip is released from the clip holder by means of a finger 100 which is pivotally mounted in a bracket 101 extending from the rear face of the slide of which the clip holder is an element. Against the rear face of the finger a rod 102 bears, this rod being held in its retracted position, shown in Fig. 4, by means of a spring 103 which maintains the rod in engagement with an arm 104 carrying a roller 105. This roller normally engages the concentric periphery 106 of the cam disk 75 and is adapted to be engaged by a relatively short hump 107 formed on the periphery 106. When the roller 105 is engaged by the hump 107 the rod 102 is pushed toward the front and causes the finger 100 to kick the free end of the clip from its mounting recess 94ᵃ. With the clip so released the pad may be shifted longitudinally of the table 41 until the proper position for attaching another clip has been reached. At this point another clip is placed in the clip holder and the above described operation repeated.

The means employed for controlling the operation of the drive shaft 29 will now be described. This means consists of a gear 108 rotatively mounted on the drive shaft and adapted to be connected therewith by means of a key 109 operated through the agency of a treadle bar 110 and a rod 111 connected therewith, see Figs. 2 and 3. Meshing with this gear is a pinion 112 rotatively mounted on a shaft 113 extending from the side of the frame and connected with a pulley 114, see Fig. 2. Adjacent to the pulley 114 is a loose pulley which is employed for receiving the drive belt and is merely rotatively mounted on the shaft 29 when it is desired to positively disconnect the entire machine from the source of power. The hub 116 of the gear 108 is provided with a series of slots 117, see Fig. 10 extending radially thereof for the purpose of receiving the key 109 which is urged into the slots by means of a spring 118 when the key is released. The key is slidingly mounted in a slot 119 formed in an enlargement 120 on the drive shaft 29, and is consequently rotatable with the shaft. Formed in the top surface of the key is a slot 121 for the purpose of receiving the end 122 of a dog 123 pivotally mounted on a stud 124 extending from the side of the machine, see Figs. 1 and 5. Abutting against the under surface of a pin 125 extending from the dog 123 is the upper end of the push rod 111. The dog is held into engagement with the surface of the enlarged portion 120 of the shaft 29 by means of a spring pressed pin 126 reciprocally mounted at its upper end in a bracket 129 extending from the frame of the machine. The forward end of the dog 123 is beveled so as to enter the notch 121 in the key 109 as the shaft rotates to bring the key into engagement therewith. The key upon engaging the beveled end of the dog is withdrawn from the slot in the hub of the gear. Thus when the dog 123 is lifted by pressing upon the treadle 110, the key is allowed to bear against the end of the hub 116 until it enters the slot next in line to receive it as the gear rotates. The entrance of the key into one of the slots 117 locks the gear to the shaft and connects the previously described mechanism to the driving pulley 114 and causes operation of the machine. As soon as the dog has been lifted to permit the key to be forced into one of the slots 117 by the spring 118, the treadle is released and the dog under the influence of the spring pressed pin 126 is forced back into engagement with the surface of the enlargement 120 of the shaft 29. This brings the beveled end 122 of the dog into position to engage the slot 121 of the key and to withdraw the key from the slot 117 which it is occupying, as rotation of the shaft is continued. As soon as the key is withdrawn the operating mechanism stops.

To hasten the stopping in order to prevent the machine repeating its operation, we have provided two brake mechanisms. One brake mechanism consists of two shoes 128 and 129, see Figs. 1 and 3, clamped frictionally upon an enlargement 130 adjacent to the enlarged portion 120 of the shaft 29. This brake serves to check the inertia of the machine when the driving power is disconnected therefrom upon withdrawal of the key 109. However, in order to insure positive stoppage of the machine at the desired place an additional set of brake shoes is provided. This set consists of a stationary brake shoe 131 mounted on the frame of the machine in position to be engaged by a brake shoe 131ª, see Fig. 4, carried by the cam disk 65. These shoes 131 and 131ª positively stop the machine at the proper point upon disconnection of the driving mechanism, and at all other times during the operation of the machine are disengaged in order that freedom of movement may be secured.

We have found that it is desirable to employ suitable shock absorbing mechanism to prevent stripping of gear teeth on the gears 108 and 112, and we have therefore frictionally mounted the rim of the gear 108 on the hub 116, see Fig. 10, such frictional mounting consisting of fiber washers 132 and 133 engaging a flanged projection 134 formed on the rim of the gear. These washers and flanges 134 are secured in frictional contact with one another and with flanges 135 and 136 by means of a series of adjustment bolts 137 spaced about the periphery of the hub. By means of this construction the shock transmitted to the teeth of the gears is greatly reduced and the length of life of the machine materially increased.

Having thus described our invention, what we claim is:

1. In a pad and clip assembling machine, the combination of a clip-holder having in its end a recess for the reception of the staple-receiving eye at one end of a clip, and having a means adjacent to its end for engaging the other end of the clip, a staple-holder opposite said clip-holder, and means for moving the clip-holder and the staple-holder toward each other to carry the prongs of the staple against the walls of the recess and into the eye of the clip.

2. In a pad and clip assembling machine, the combination of a clip-holder having in its end a recess for the reception of the eye of the clip, and having an aperture located at a distance from the end smaller than the distance between the ends of the clip and adapted to receive the other end of the clip, a holder for the staple opposite the clip-holder, and means for bringing the clip-holder and the staple-holder together to carry the ends of the staple into the eye of the clip.

3. In a pad and clip assembling machine, the combination of a clip-holder having in its end a recess for the reception of the staple-receiving eye at one end of a clip, and having an aperture adjacent to said end for receiving the other end of the clip, a finger adjacent to the clip-holder, means adapted to actuate the finger to disengage the end of the clip from the aperture, after the clip is attached to the pad, a staple-holder opposite the clip-holder, and means for moving the clip-holder and the staple-holder toward each other to carry the ends of the staple into the eye of the clip.

4. In a machine for assembling pads, clips and staples, the combination of a staple forming mechanism, means coöperating with said mechanism for passing the tangs of a staple formed thereby through a pad located on the machine and for bending the tangs into overlapping engagement with a clip located on the pad, and a washer feeding mechanism for inserting a washer between the staple and the pad before said means is brought into operation.

5. In combination in a pad, clip and staple assembling machine, a wire cutting mechanism adapted to form beveled ends on a wire, staple forming mechanism adapted to bend the ends of the wire to parallel positions to form a staple, means coöperating with the mechanism for passing the tangs of the staple through the pad and for bending the beveled ends of the tangs into coöperating overlapping engagement with each other upon a clip located on the pad, and a washer feeding mechanism for inserting a washer between the staple and the pad before said means is brought into operation.

6. A pad, clip and staple assembling machine comprising a wire feeding device, a wire cutting device for cutting sections from the wire delivered by the feeding device and for forming beveled ends thereon, mechanism for bending the ends of each cut off wire section to form a staple, means coöperating with said mechanism for passing the tangs of the staple through the pad and into overlapping engagement with a clip located on the pad, and a washer feeding mechanism for inserting a washer between the staple and the pad before said means is brought into operation.

7. In a pad, clip and staple assembling machine, the combination of an intermittently operating wire feeding device adapted to feed wire in uniform lengths, a wire cutting device located adjacent to the feeding device and adapted to cut off the lengths delivered by the feeding device, a staple forming mechanism coöperating with the cutting device and adapted to bend the ends of each cut off length at right angles to its intermediate portion, means for clenching the ends of the staple formed by the staple mechanism into engagement with a clip located on the pad, and a washer feeding mechanism for inserting a washer between the staple and the pad before the means is brought into operation.

8. In combination in a pad, clip and staple assembling machine, a wire cutting mechanism adapted to form beveled ends on a wire, staple forming mechanism consisting of a forming die for engaging the center of the beveled wire, side bending members located in each side of the forming die and adapted to bend the beveled ends of the wire around the forming die to form a staple, means coöperating with the staple forming mechanism for passing the tangs of the staple through the pad and for bending the beveled ends of the device into coöperating overlapping engagement with each other upon a clip located on the pad, and a washer feeding mechanism for inserting the washer between the staple and the pad before said means is brought into operation.

9. In a pad, clip and staple assembling machine, the combination of a wire feeding device, a wire cutting device for cutting sections from the wire delivered by the wire feeding device and for forming beveled ends thereon, a forming die for engaging the center of the wire cut off by the wire cutting device, side bending members located on each side of the forming die and adapted to bend the beveled ends of the cut off wire section around the forming die to form a staple, means coöperating with the staple forming mechanism for passing the tangs of the staple through the pad and into overlapping engagement with a clip located on the pad, and a washer feeding mechanism for inserting a washer between the staple and the pad before said means is brought into operation.

10. In combination in a pad, clip and staple assembling machine, an intermittently operating wire feeding device adapted to feed wire in uniform lengths, a wire cutting device located adjacent to the feeding device and adapted to cut off the lengths delivered by the feeding device, a staple forming mechanism coöperating with the cutting device and consisting of a forming die for engaging the center of each cut off length of wire, side bending members located on each side of the forming die and adapted to bend the ends of each cut off length around the forming die and at right angles to the portion engaged by the forming die, means for clenching the ends of the staple so formed into engagement with a clip located on the pad, and a washer feeding mechanism for inserting a washer between the staple and the pad before said means is brought into operation.

11. A pad, clip and staple assembling machine comprising a staple forming mechanism, means coöperating with the mechanism for passing the tangs of the staple formed by said mechanism through a pad located on the machine, a clenching die for bending the tangs projecting through the pad into overlapping engagement with a clip located on the pad, and a washer feeding mechanism for inserting a washer between the staple and the pad before said means is brought into operation.

12. In a pad, clip and staple assembling machine, the combination of a wire cutting mechanism adapted to form beveled ends of a wire, staple forming mechanism adapted to bend the ends of the wire into parallel positions to form a staple, means coöperating with the mechanism for passing the tangs of the staple through the pad, a clenching die for bending the beveled ends of the staple into coöperating overlapping engagement with each other upon a clip located on the pad, and a washer feeding mechanism for inserting a washer between the staple and the pad before said means is brought into operation.

13. In combination in a pad, clip and staple assembling machine, a wire feeding device, a wire cutting device for cutting sections from the wire delivered by the feeding device and for forming beveled ends thereon, mechanism for bending the ends of the cut off wire section to form a staple, means coöperating with said mechanism for passing the tangs of the staple through the pad, a clenching die for bending the ends projecting through the pad into overlapping engagement with a clip located on the pad, and a washer feeding mechanism for inserting a washer between the staple and the pad before said means is brought into operation.

14. A pad, clip and staple assembling machine comprising an intermittently operating wire feeding device adapted to feed wire in uniform lengths, a wire cutting device located adjacent to the feeding device and adapted to cut off lengths delivered by the feeding device, a staple forming mechanism for bending the wire cut off by the cutting device to form a staple, a clenching die for clenching the ends of the staple into engagement with a clip located on the pad, and a washer feeding mechanism for inserting a washer between the staple and the pad before the clenching die is brought into operation.

15. In a machine for assembling pads, clips and staples, the combination of a staple forming mechanism consisting of a forming die, side members located on each side of the forming die and adapted to bend a wire around the forming die to form a staple, means coöperating with said mechanism for passing the tangs of the staple through a pad located on the machine, a clenching die for bending the tangs into overlapping engagement with a clip located on the pad to secure the clip to the pad, and a washer feeding mechanism for inserting the washer between the staple and the pad before said means is brought into operation.

16. In combination in a pad, clip and staple assembling machine, a wire cutting mechanism adapted to form beveled ends on a wire, staple forming mechanism consisting of a forming die for engaging the center of the beveled wire, side bending members located on each side of the forming die and adapted to be moved to bend the beveled ends of the wire around the forming die to form a staple, means coöperating with the staple forming mechanism for passing the tangs of the staple through the pad, a clenching die for bending the beveled ends of the tangs into coöperating overlapping engagement with each other upon a clip located on the pad, and a washer feeding mechanism for inserting a washer between the staple and the pad before said means is brought into operation.

17. A pad, clip and staple assembling machine comprising a wire feeding device, a wire cutting device for cutting sections from the wire delivered by the feeding device and for forming beveled ends thereon, a forming die for engaging the center of the wire cut off by the wire cutting device, side bending members located on each side of the forming die and adapted to bend the beveled ends of each cut off wire section around the forming die to form a staple, means coöperating with the staple forming mechanism for passing the tangs of the staple through the pad, a washer feeding mechanism for inserting a washer between the staple and the pad before said means is brought into operation, and a clenching die for bending the tangs into overlapping engagement with a clip located on the pad.

18. In a pad, clip and staple assembling machine, the combination of an intermittently operating wire feeding device adapted to feed wire in uniform lengths, a wire cutting device located adjacent to the feeding device and adapted to cut off the lengths delivered by the feeding device, a staple forming and driving means coöperating with the cutting device and consisting of a forming die for engaging the center of each cut off length of wire, side bending members located on each side of the forming die and adapted to bend the ends of each cut off length around the forming die and at right angles to the center portion engaged by the forming die, a clenching die for clenching the ends of the staple into engagement with a clip located on the pad, and a washer feeding mechanism for inserting a washer between the staple and the pad before said means is brought into operation.

19. In combination in a machine for assembling pads, clips and staples, a staple forming mechanism consisting of a forming die, side bending members located on each side of the forming die and adapted to bend the wire around the forming die to form a staple, means coöperating with said mechanism for passing the tangs of the staple through a pad located on the machine and for bending the tangs into overlapping engagement with a clip to secure the clip to the pad, and a washer feeding mechanism for inserting a washer between the staple and the pad before said means is brought into operation.

20. In a pad, clip and staple assembling machine, the combination of staple supplying and driving devices, and means for bending the tangs of the staple into engagement with a clip located on the pad after the tangs have been passed through the pad by said driving device, and a washer feeding mechanism for inserting a washer between the staple and the pad before said means is brought into operation.

21. In combination in a pad, clip and staple assembling machine, a staple driving device adapted to force the tangs of a staple through a pad located on the machine, a clip holder having a tang bending and guiding surface adapted to bend the tangs of the staple into engagement with a clip supported thereby, and a washer feeding mechanism for inserting a washer between the staple and the pad before the staple driving device is brought into operation.

22. In combination in a pad, clip and staple assembling machine, a staple driving device adapted to force the tangs of a staple through a pad located on the machine, a clip holder having a tang bending and guiding surface adapted to direct the tangs of the staple into engagement with a clip supported thereby, and means for disengaging the clip from the holder after the tangs of the staple have been bent into engagement therewith.

In testimony whereof, we have hereunto subscribed our names this 3rd day of November, 1915, at Greenfield, Ohio, and upon this 8th day of November at Stratford, Connecticut.

ARTHUR J. LEWIS.
ARTHUR E. McCLAIN.
WALTER OLE SKEEN.
JAMES O. MASSEY.

Witnesses as to Lewis:
WALTER B. CAIN,
B. J. CALKINS.

Witnesses as to McClain, Skeen, and Massey:
DELLA SMALLEY,
HARVEY HYER.

Copies of this patent may be obtained for five cents each, by addressing the "Commissioner of Patents, Washington, D. C."